Dec. 7, 1965  P. M. BRISTER ETAL  3,221,925
PRESSURE VESSEL CONSTRUCTION
Filed Nov. 21, 1960
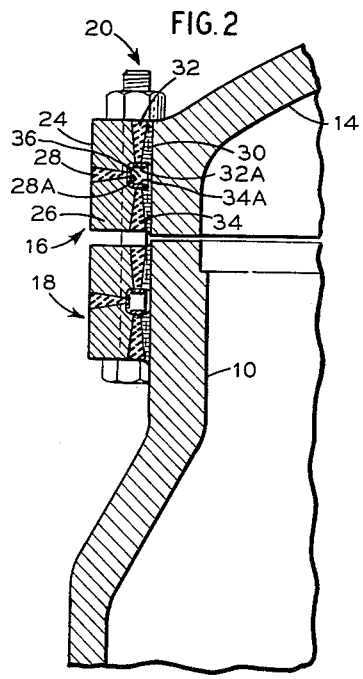
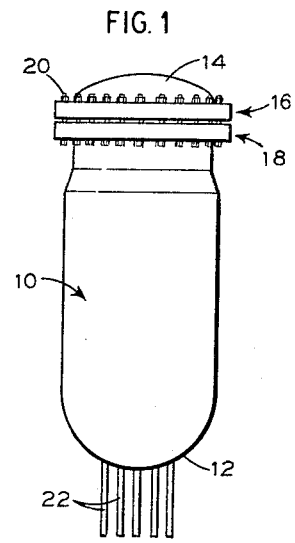
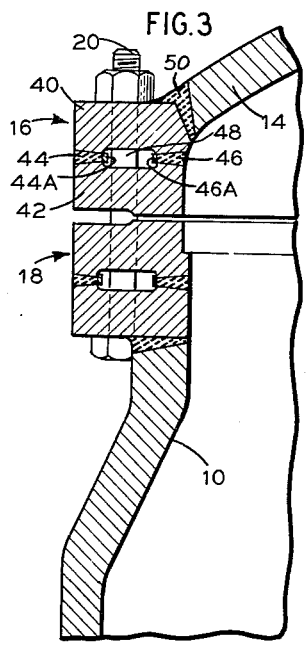
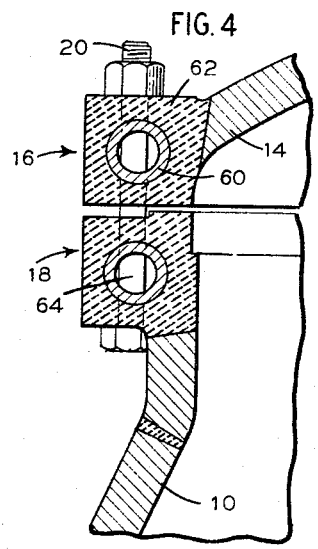
INVENTORS
Paul M. Brister
Otis R. Carpenter
George F. Friese
John F. Harvey
John W. Leonard, Jr.
BY  *J. P. Moran*
ATTORNEY

# United States Patent Office 3,221,925
Patented Dec. 7, 1965

3,221,925
PRESSURE VESSEL CONSTRUCTION
Paul M. Brister, Akron, Otis R. Carpenter and George F. Friese, Barberton, John F. Harvey, Akron, and John W. Leonard, Jr., Wadsworth, Ohio, assignors to The Babcock & Wilcox Company, New York, N.Y., a corporation of New Jersey
Filed Nov. 21, 1960, Ser. No. 70,752
3 Claims. (Cl. 220—73)

This invention relates in general to a pressure vessel construction and more particularly it relates to a special flange construction for pressure vessels.

In many of the modern day processes, high fluid pressures are required which dictate that large size reactor vessels be constructed. Ordinary engineering principles dictate that as the diameter of the vessels get larger, the thickness of the vessels increases. As the thickness of the vessels increase, so also does the size of any flange which may be attached to the vessel.

In most of these modern day vessels, there is a requirement that the flange have a full opening roughly equal to the diameter of the interior of the vessel. This, of course, requires flanges of extraordinary size. When such flanges are added to the pressure vessel wall, there results a thickness of metal which is so great that there is a time versus temperature effect that limits the usefulness of the vessel. This is because the distance for the heat to travel is so great that it requires that the vessel by very slowly heated up or cooled down to avoid excessive thermal stresses. Thus, in certain instances, the heating of the vessel may require more than a day.

Moreover, a further problem is that as the size of the vessels increases, the probability for latent imperfections in the metal increases rapidly so that the reject rate is high for the plate used in such vessels.

The industry has now reached a point where they can no longer build vessels for pressurized water type nuclear reactors, for example, that are any larger than those under construction because the metal plate thickness has become so large that the number of imperfections contained in the plate and the expense of correcting the imperfections for obtaining a perfect plate outweigh any economic gains that may be obtained by utilizing larger vessels. Generally, a plate having a thickness of less than eight (8) inches may be obtained with a reasonable assurance that it may be economically useable. Accordingly, the present invention provides a pressure vessel flange construction which allows very large and thick flanges to be constructed out of material which is less than eight (8) inches thick and thus is easily procurable.

Moreover, the invention provides a closure flange for a pressure vessel which is formed with a passage extending around its circumference.

Furthermore, the invention provides an improved flange in which at least a portion of the flange is composed of weldments at a position external of the passage of the flange.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which specific embodiments of the invention are illustrated and described.

FIG. 1 is a side view of a pressure vessel of the type improved by the invention;

FIG. 2 is a partial vertical section of the flanges illustrating one embodiment;

FIG. 3 is a partial vertical section of a second embodiment of the invention; and FIG. 4 is a partial vertical section of a third embodiment of the invention.

With reference to FIG. 1, a typical reactor vessel for an atomic energy application comprises a vertically elongated vessel 10 of circular cross-section having a hemispherical lower end 12. A dished head 14 is integrally attached to a flange 16 that is arranged to mate with a flange 18 on the vessel 10. Typically, these two flanges are held together in a sealing relationship by a multiplicity of uniformly and circumferentially spaced bolts 20. As the vessel 10 is used for reactor service, there would be a plurality of nozzles 22 passing through the hemispherical head 12 through which the reactor control rods would operate.

A preferred embodiment of the invention is shown in FIG. 2. In this embodiment and all subsequent ones, like numbers as shown in FIG. 1 will be used to designate like members. Thus, reactor head 14 is in sealing relationship with the vessel 10 and is held in place by flanges 16 and 18 and the bolting means 20. The flanges on the vessel are fabricated out of metal plates having a thickness of less than eight (8) inches, by taking plate 24, cutting it into the shape of a ring and placing it above a second similarly shaped ring 26; these two rings being joined by a weldment 28 which is backed up by a weld back up ring 28A. The reactor vessel head 14 has a weldment 30 deposited on its outer periphery and shaped with a circumferential groove at its center portion. It is machined so as to have a generally double triangular cross-section as illustrated. The rings 24 and 26 are joined to the weldment 30 on vessel head 14 by virtue of two weldments 32, 34 each of which are backed up by back up rings 32A, 34A. Thus, there is formed a closure flange integrally attached to the vessel which has a generally rectangular cross-section formed with a hollow passage 36 that extends throughout the circumference of the flange. At some point in the circumference there is at least one opening to the hollow opening 36 to allow access to its interior. The flange 18 is constructed in a similar manner and its construction may be readily understood with reference to the above explanation.

FIG. 3 is a second embodiment in which the flange 16 is composed of two rings 40, 42 that are joined to each other by weldments 44, 46 that are backed up by weld rings 44A and 46A. Such rings have their mating portions shaped to form interiorly, a circumferentially extending hollow passage 48 extending throughout the circumference of the flange. The flange 16 is also joined to the closure head 14 by a weldment 50. The flange 18 is constructed in a like manner. Thus, FIG. 3 provides a constructed flange at an opening and has a generally rectangular cross-section formed with the hollow center extending throughout the circumference of the flange.

FIG. 4 is a third embodiment of a prefabricated flange for a vessel in which a toroid 60 made out of tubing is placed about the peripheral extent of the head 14 and submerged within a deposited weldment 62. The weldment 62 is deposited by progressional melting of pieces of a welding rod on top of each other and then machining the deposit to a generally rectangular shape. The mating flange 18 is similarly constructed. Thus, FIG. 4 provides a closure flange attached to the wall of a pressure vessel at an opening and has a generally rectangular cross-section formed with a hollow passage 64 extending throughout the circumference of the flange.

The openings 36, 48 and 64 in all of the figures are arranged with some form of access-egress to the passages which provides at least a passage to place a capsule of radioactive material in the flange which capsule, when passed around the opening, will provide a radiographic record of the flange and permit the detection of flaws therein.

As an alternative, the flange may be attached to a source of heating or cooling fluid which would be circulated through the hollow circumferential passage in the flange. By this device, the flange may be cooled or heated at a rate greater than would be possible should the flange be heated by heat flowing from either side of it. Moreover, the heating may be provided by electric heating elements that are located within the passage in the flange.

Thus, the present invention provides a construction which allows flanges to be built of a greater size than is possible today. Further, the flange is arranged so that it may be completely radiographed and thus be constructed more safely. Further, the inherent form of the flange provides a device for accelerating the heating and cooling rate of the flange and thus improves the economy of its operation.

While in accordance with the provisions of the statutes we have illustrated and described herein a specific form of the invention now known to us, those skilled in the art will understand that changes may be made in the form of the apparatus disclosed without departing from the spirit of the invention covered by our claims, and that certain features of the invention may sometimes be used to advantage without a corresponding use of the other features.

What is claimed is:

1. In combination with a high temperature, high pressure large diameter vessel having a thick generally cylindrical wall with an opening at one end thereof, a closure head operative to close said opening, a heavy closure flange extending about said opening of said vessel and integrally attached to the wall of said vessel, a second heavy closure flange integrally attached to said closure head, said second closure flange arranged in face-to-face alignment with said first closure flange when said head is in operative position, said flanges having physical dimensions as required by the operating conditions of said vessel as to be substantially beyond commercially available stock plate sizes, each of said flanges being formed of at least two substantially similar annular plate elements integrally joined by a weldment, said plate elements each having a minimum cross sectional dimension substantially equal to the thickness of said pressure vessel wall and being made from commercially available plate stock.

2. In combination with a high temperature, high pressure large diameter vessel having a thick generally cylindrical wall with an opening at one end thereof, a closure head operative to close said opening, a heavy closure flange extending about said opening of said vessel and integrally attached to the wall of said vessel, a second heavy closure flange integrally attached to said closure head, said second closure flange arranged in face-to-face alignment with said first closure flange when said head is in operative position, said flanges having physical dimensions as required by the operating conditions of said vessel as to be beyond current ability to test for integrity and substantially beyond commercially available stock plate sizes, each of said flanges being formed of at least two substantially similar annular plate elements integrally joined by a weldment to form a generally rectangular cross section with an annular passage formed between said similar elements, said plate elements each being made from commercially available plate stock.

3. In combination with a high temperature, high pressure large diameter vessel having a thick generally cylindrical wall with an opening at one end thereof, a closure head operative to close said opening, a heavy closure flange extending about said opening of said vessel and integrally attached to the wall of said vessel, a second heavy closure flange integrally attached to said closure head, said second closure flange arranged in face-to-face alignment with said first closure flange when said head is in operative position, said flanges having physical dimensions as required by the operating conditions of the vessel as to be beyond current ability to test for integrity and substantially beyond commercially available stock plate sizes, each of said flanges being formed of at least two substantially similar annular plate elements integrally joined by a weldment to form a generally rectangular cross section with an annular passage formed between said similar elements, said plate elements each being made from commercially available plate stock, said annular passage permitting testing for the integrity of said flange and having a cross-sectional area substantially smaller than the cross-sectional area of said flange resulting in a substantially solid flange.

References Cited by the Examiner

UNITED STATES PATENTS

| | | | |
|---|---|---|---|
| 1,545,131 | 7/1925 | Dillon et al. | 220—73 X |
| 1,902,110 | 3/1933 | Urich | 220—45 X |
| 1,931,679 | 10/1933 | Price | 220—3 X |
| 2,568,518 | 9/1951 | Smith | 220—46 |
| 2,940,734 | 6/1960 | Harvey | 220—3 |

FOREIGN PATENTS

| | | |
|---|---|---|
| 527,919 | 6/1931 | Germany. |
| 581,445 | 10/1946 | Great Britain. |

THERON E. CONDON, *Primary Examiner.*

EARLE J. DRUMMOND, *Examiner.*